United States Patent
Samuni et al.

(10) Patent No.: US 9,054,954 B2
(45) Date of Patent: Jun. 9, 2015

(54) DETERMINING FALSE ALARMS IN AN IT APPLICATION

(71) Applicant: Hewlett-Packard Development Company, L.P., Houston, TX (US)

(72) Inventors: Eran Samuni, Givataim (IL); Shahar Tal, Jerusalem (IL); Ori Adijes, Ramat Gan (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 185 days.

(21) Appl. No.: 13/800,436

(22) Filed: Mar. 13, 2013

(65) Prior Publication Data

US 2014/0281734 A1 Sep. 18, 2014

(51) Int. Cl.
*G06F 11/00* (2006.01)
*H04L 12/24* (2006.01)
*G06F 11/30* (2006.01)
*G06F 11/07* (2006.01)
*G06F 11/34* (2006.01)

(52) U.S. Cl.
CPC ........ *H04L 41/0627* (2013.01); *G06F 11/3058* (2013.01); *G06F 11/0709* (2013.01); *G06F 11/3452* (2013.01); *G06F 11/079* (2013.01)

(58) Field of Classification Search
CPC . G06F 11/079; G06F 11/3452; G06F 11/006; G06F 11/0709; G06F 11/3058
See application file for complete search history.

(56) References Cited

U.S. PATENT DOCUMENTS

| | | | |
|---|---|---|---|
| 7,917,393 B2 | 3/2011 | Valdes et al. | |
| 2007/0226554 A1* | 9/2007 | Greaves et al. | 714/724 |
| 2009/0271792 A1 | 10/2009 | Mills | |
| 2012/0096549 A1 | 4/2012 | Amini et al. | |
| 2012/0185735 A1* | 7/2012 | Sambamurthy et al. | 714/47.1 |
| 2012/0259962 A1 | 10/2012 | Bose et al. | |
| 2013/0124923 A1* | 5/2013 | Wang et al. | 714/37 |
| 2013/0275812 A1* | 10/2013 | Bernstein et al. | 714/47.1 |

OTHER PUBLICATIONS

Chandola, V. et al., Anomaly Detection: a Survey, Jul. 15, 2009, 58 pages, ACM Computing Surveys, vol. 41, Issue 3, Article 15, Minneapolis, University of Minnesota http://www.vs.inf.ethz.ch/edu/HS2011/CPS/papers/chandola09_anomaly-detection-survey.pdf.

Laxhammar, R., Anomaly Detection in Trajectory Data for Surveillance Applications, Sep. 13 2011, 156 pages, Licentiate Thesis, Orebro University http://www.oru.se/PageFiles/15389/Lic%20uppsats%20Rikard%20Laxhammar.pdf.

* cited by examiner

*Primary Examiner* — Charles Ehne
(74) *Attorney, Agent, or Firm* — International IP Law Group

(57) ABSTRACT

An example of the present invention provides a method and system for automatically suppressing false alarms in an IT system, such as an IT application. The method includes consolidating abnormal metrics into a single anomaly. A size of the anomaly relative to the IT application is determined, as well as a distribution of the anomaly in the IT application. A false alarm is determined based on the size and the distribution of the anomaly.

20 Claims, 4 Drawing Sheets

DETERMINING FALSE ALARMS IN AN IT APPLICATION

BACKGROUND

In an information technology (IT) system, the state of the system, such as performance, is monitored. A measurement of the state of the system is a metric. Abnormal measurements are regularly produced during monitoring of the system. Abnormal measurements or behavior is a metrics value that exceeds the normal behavior or baseline. Abnormal measurements produce an alarm in the system. A user is notified of alarms in the system in order for the user to investigate and correct problems causing the alarms. However, if the alarm is produced due to noise in the system, the alarm is a false alarm.

BRIEF DESCRIPTION OF THE DRAWINGS

Certain embodiments are described in the following detailed description and in reference to the drawings, in which.

DETAILED DESCRIPTION OF SPECIFIC EMBODIMENTS

The present disclosure relates to techniques for automatically suppressing false alarms in a computing network monitoring system. The state of an IT system is commonly monitored, such that the current state of the system, such as system performance and/or productivity, is known at any given time. A measurement of the state of the system is a metric. Abnormal measurements or metrics trigger an alarm to a user. In response to the alarm, a user may investigate and/or correct the problem causing the abnormal measurement.

Abnormal metrics in IT applications are abnormal measurements, or metrics values that exceed the normal behavior or baseline, produced in IT applications. An anomaly is a grouping of abnormal metrics and will contain grouped isolated information of many abnormal metrics that are produced at the same time and are related to the same application. However, in most IT systems there is constant noise in the system, causing metrics to peak from time to time and act abnormally. This behavior does not impact the system. This situation in which the system does not behave normally, but the business is not affected, is considered a false alarm.

False alarms are reported to users for investigation and resolution of the problem causing the false alarm. However, continuous reporting of false alarms costs a user time and money. By suppressing false alarms, less time and money is spent addressing false problems and the user can more effectively use their time addressing real problems. The techniques used herein can be used to bring to a user's attention only non-false alarms.

Figure 1:
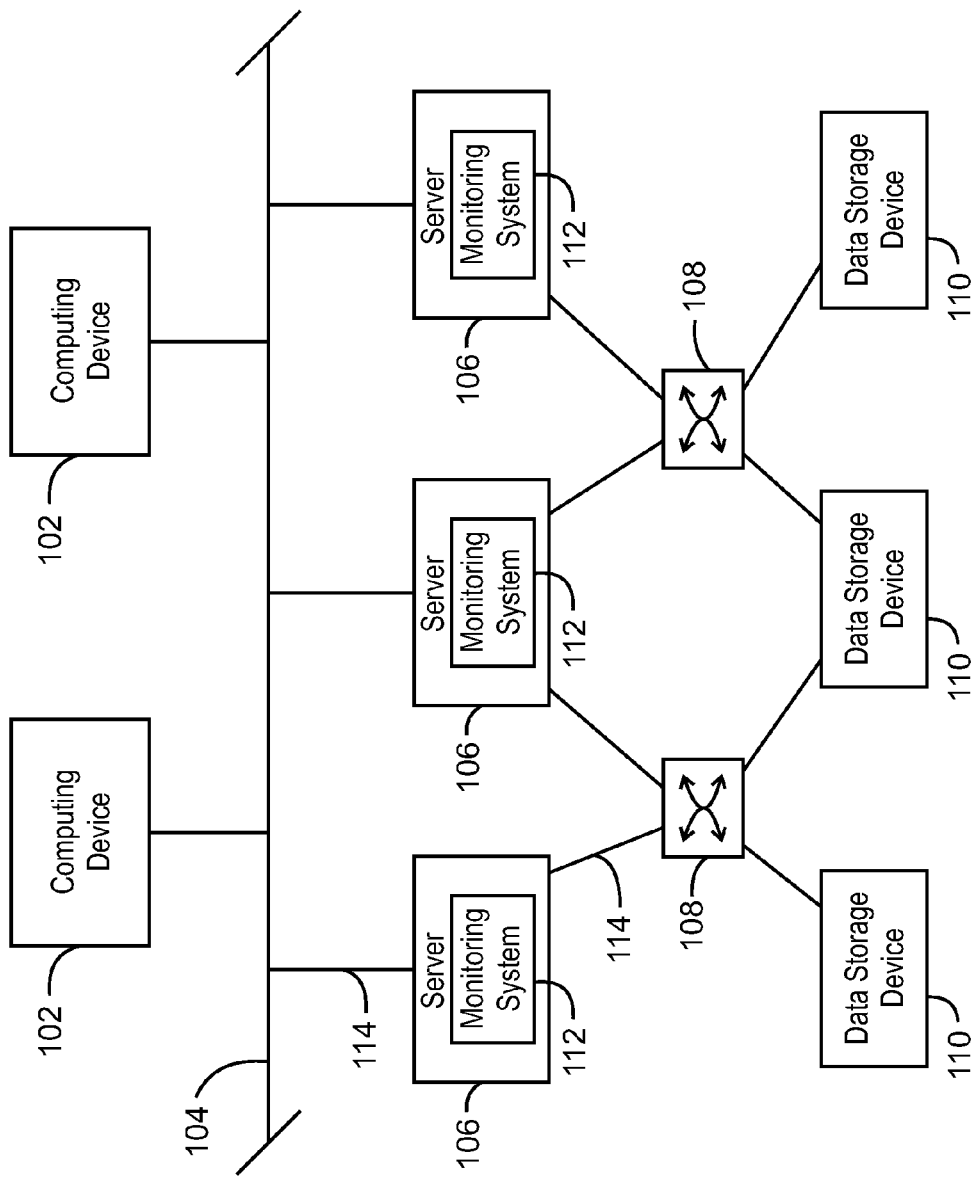
FIG. 1 is a block diagram of an example of a system employing a method of automatically suppressing false alarms in an computing network monitoring system.

FIG. 1 is a block diagram of a system 100 employing a method of automatically suppressing false alarms in a computing network. The computing device 102 can include desktop computers, laptop computers, tablet computers, personal digital assistants (PDAs), cellular phones, such as smartphones, or any other suitable computing device. The system 100 may include network line 104 for connecting computing device 102 to server 106. The network line 104 can distribute information packets to various nodes contained in the network.

The nodes supported by the network may include computing devices 102, servers 106, switchers 108, and data storage devices 110 connected to one another by L2 links 114. The computing devices 102, servers 106, and data storage devices 110 can serve as end nodes. An L2 link 114 is an interface between nodes that has lower priority than inter-AS or inter-region links.

A switcher 108 is a device that can receive, transmit, and forward packets of information between different devices in a network. In the embodiment shown in FIG. 1, the switchers 108 are linked to the servers 106 and data storage devices 110. The switchers 108 may transfer information stored in the data storage devices 110 to the servers 106, or send information sent from the servers 106 to be saved in the data storage devices 110 for future access. As a node, a switcher 108 may have higher priority than an end node device such as a computing device 102, server 106, or data storage device 110.

The servers 106 include a monitoring system 112. The monitoring system 112 may exist on a single server in a network. In another example, the monitoring system 112 may exist on multiple servers 106.

Metrics, including system metrics and business metrics, quantify the state of the system or computing device 102. For example, system metrics can monitor a host or server in a system and detail the CPU usage. A high value can determine a high load on the server/host that needs to be handled, such as by replacing the server with a stronger server, or by adding a new, or by adding more RAM to the server. In another example, business metrics can monitor the time between a user requesting information and the user receiving a response to the request. For example, when a user logs in to a website, the business metrics can monitor the time between when the user clicks "login" and when the user receives a response, such as a change in the webpage. A high response time can be cause by a high load on the network, or a server, or a database in the system.

The monitoring system 112 monitors activity on the IT system 100, such as activity in an application running on the computing device 102, measured by the metrics, to suppress false alarms caused by abnormal metrics. The monitoring system 112 can report the status of the IT system 100 to a network operations center (NOC), such as computing device 102. The monitoring system 112 analyzes abnormal metrics as a single anomaly, rather than analyzing each metric individually. The monitoring system 112 determines the amount of abnormal behavior in the metrics of the anomaly as compared to the entire system or application and determines the distribution of abnormal behavior in the anomaly.

Figure 2:
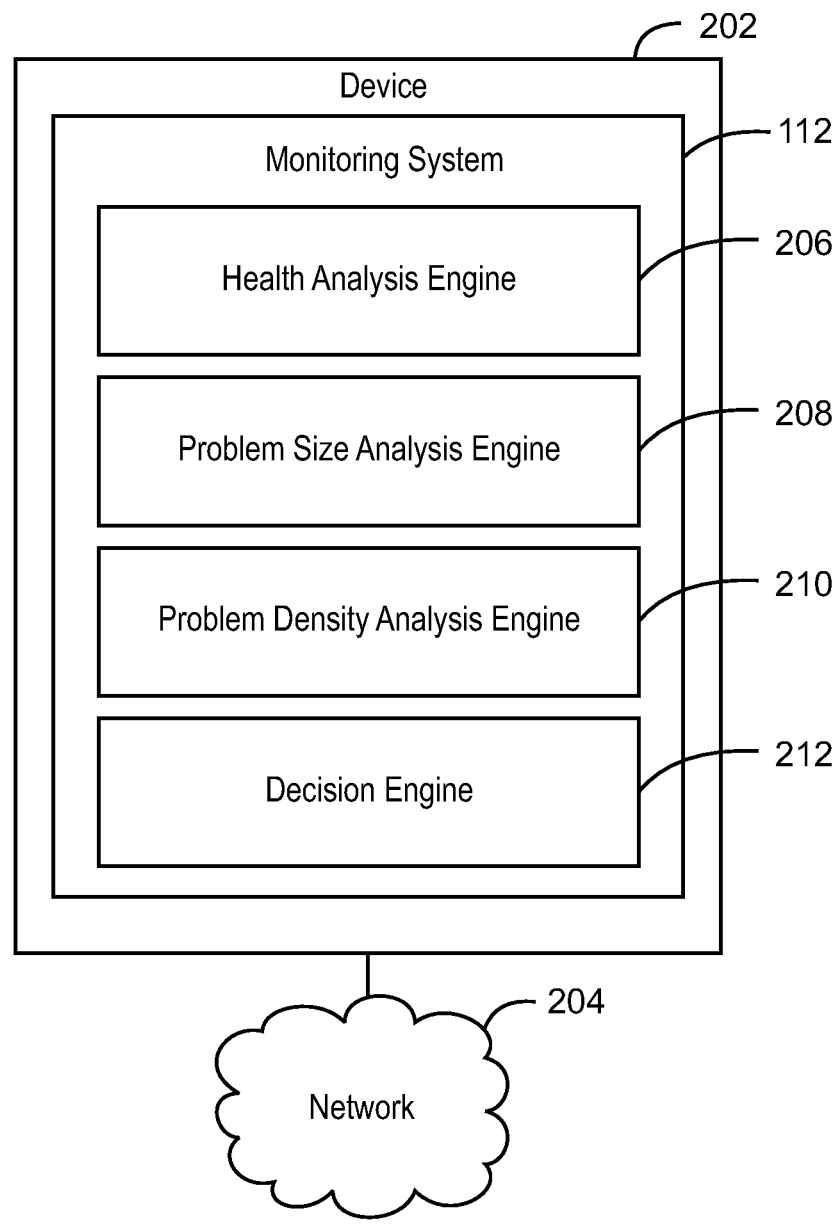
FIG. 2 is a block diagram of an example of a system for automatically suppressing false alarms in an IT system.

FIG. 2 is a block diagram of a system for automatically suppressing false alarms in a computing network. The system 200 can include a device 202 communicatively coupled to a network 204. Device 202 can be a server, such as server 106. The device 202 includes monitoring system 112. The monitoring system 112 receives data, in the form of metrics, from monitors which monitor all aspects of the IT system, including host, network, database, traffic, etc. The monitors also monitor all IT that derives from usage of an application, such as an application running on a server and accessed by a variety of users. Monitors include system monitors and business monitors.

Monitoring system 112 includes engines for detecting and prioritizing network faults, including a health analysis engine 206, a problem size analysis engine 208, a problem density analysis engine 210, and a decision engine 212. Each engine 206-212 includes a combination of hardware and programming. For example, the engine hardware can be a non-transitory, computer-readable medium for storing the instructions, one or more processors for executing the instructions, or a combination thereof. In an example, the engines 206-212 analyze the performance of an IT system or an IT application and suppress false alarms. The engines 206-212 analyze performance by analyzing the information received from metrics, such as business metrics and system metrics.

A computing device (not shown) can be coupled to the server via the network 204, such as through a wired connection or a wireless connection. The computing device can be a desktop computer, a laptop computer, a tablet computer, a personal digital assistant (PDA), a cellular phone, such as a smartphone, or any other suitable electronic device. The computing device can access an application, such as an application running on a server. In an example, a non-suppressed alarm is received in the computing device. In another example, a non-suppressed alarm is received in a network operations center (NOC). In a further example, the computing device queries the monitoring system to determine the status of the IT system or the IT application.

The engines 206, 208, 210, and 212 are configured to perform the process of identifying and suppressing false alarms. For example, the health analysis engine 206 can consolidate abnormal metrics to form a single anomaly for analysis. By consolidating the metrics, the metrics are analyzed together as a group, rather than analyzing each metric individually. Metrics include system metrics and business metrics. The health analysis engine 206 consolidates abnormal metrics using a selection of algorithms.

The problem size analysis engine 208 can determine the abnormal size of the anomaly, or the amount of abnormal metrics, relative to the entire system or application. The problem size analysis engine 208 determines the abnormal size of the anomaly using a selection of algorithms. The abnormal size of the anomaly can be expressed as a percentage. The determined abnormal size of the anomaly is assessed by the problem size analysis engine 208 to determine if the abnormal size of the anomaly exceeds a predetermined threshold. The threshold can be set by a user or a manufacturer. The threshold can be unique to a given computing device or unique to each application on a computing device.

The problem density analysis engine 210 can determine the distribution of the anomaly in the IT system or application. The problem density analysis engine 210 determines if the anomaly is localized within a dimension of the application or if the anomaly is distributed throughout the application. For example, in an application of a computing system accessed by users in a variety of locations, the problem density analysis engine 210 determines if the anomaly is localized to a particular access location or if the anomaly is spread across a variety of access locations.

The decision engine 212 can determine a false alarm or non-false alarm based on the determination of the problem size analysis engine 208 and the problem density analysis engine 210. If the problem size analysis engine 208 determines that the amount of anomalies in the anomaly does not exceed a predetermined threshold, the alarm is determined to be false. However, if the problem size analysis engine 208 determines that the amount of anomalies in of the anomaly exceeds a predetermined threshold, an alarm triggered by anomalies is determined to be non-false.

If the problem density analysis engine 210 determines that the anomaly is distributed throughout the IT system or IT application, the decision engine 212 determines that an alarm is false. However, if the problem density analysis engine 210 determines that the anomaly is localized within the application, the decision engine 212 determines that the alarm is non-false. If an alarm is determined to be false by the determination of one of engines 208 and 210 and determined to be non-false by the remaining engine 208 or 210, the decision engine 212 determines the alarm is non-false. For example, if an alarm is indicated as false based on the determination of the problem size analysis engine 208 and is indicated as non-false based on the determination of the problem density analysis engine 210, the decision engine 212 determines that the alarm is non-false. If both engine 208 and engine 210 determines the alarm is false, the decision engine 212 determines the alarm is false. If both engine 208 and engine 210 indicate that the alarm is non-false, the decision engine 212 determines the alarm is non-false. If the decision engine 212 determines that an alarm is false, the alarm is suppressed by the monitoring system. If the decision engine 212 determines that an alarm is non-false, the computing device notifies the user so that the user may investigate the source of the alarm and/or correct the cause of the abnormal behavior.

In an example, an IT application, such as an ebook purchasing application, is accessible by users in a variety of locations. The IT application includes several metrics representing the aspects of the application. For example, the login, SearchBook, AddToCart, BuyBook, and Logout aspects of the application, listed in the charts, are each represented by a metric which quantifies the corresponding aspect of the system. For example, an individual metric quantifies the performance of each aspect of the system in each user location. If a metric registers behavior exceeding a baseline, such as a lack of performance for a period of time exceeding a predetermined baseline, the behavior is considered abnormal and an abnormal metric is registered. The abnormal metrics are consolidated to a single anomaly for analysis so that the abnormal metrics of a system are analyzed as a whole, rather than analyzing each abnormal metric individually. For the examples discussed below, there are twenty metrics representing each of the five aspects of the system (Login, Search Book, AddToCart, BuyBook, and Logout) for each of the four locations (New York, Jerusalem, Haifa, and Yehud) from which users can access the system.

The following charts represent examples of the current system for suppressing false alarms. The columns represent user location and the rows represent transactions. The Xs represent abnormal behavior in the metrics.

CHART (1)

|  | New York | Jerusalem | Haifa | Yehud |
|---|---|---|---|---|
| Login | X | | | |
| Search Book | X | | | |
| AddToCart | X | | | X |
| BuyBook | X | | | |
| Logout | | | | |

For example, chart (1) illustrates the metrics of the IT application. The threshold of abnormal behavior of the system is set as 30%. As illustrated, of the twenty metrics in the system, five of the metrics are abnormal, represented in the chart by Xs. The overall (25%) amount of abnormal behavior (5 metrics out of a total 20 metrics), i.e. the size of the anomaly, is less than the threshold of 30%. As such, the alarm is considered false by the problem size analysis engine. However, the abnormal behavior is consolidated, i.e. the anomaly is localized, in a specific area or dimension, i.e. all New York users are suffering from performance issues. Therefore, the alarm is identified as non-false by the problem density analysis engine. Because the alarm is identified as non-false by one of the analysis engines of the monitoring system, the alarm is not suppressed and a user is notified. In an example, the user can receive notification on the device using the IT application or the user can receive an alert in a network operations center (NOC).

CHART (2)

|  | New York | Jerusalem | Haifa | Yehud |
|---|---|---|---|---|
| Login | X |  | X |  |
| Search Book |  |  |  |  |
| AddToCart |  | X |  | X |
| BuyBook | X |  |  |  |
| Logout |  |  | X |  |

In another example, chart (2) represents the same IT application as illustrated in Chart (1). In chart 2, the abnormal behavior is 30% (6 abnormal metrics of the total 20 metrics), equal to the threshold. As such, the alarm is considered false based on the overall amount of abnormal behavior in the system, as the abnormal behavior does not exceed the threshold. In addition, the abnormal behavior is spread throughout the application. The alarm is therefore determined to be false. This false alarm indicates the system is not experiencing a real problem, but that there is general noise in the system. The monitoring system can be used to monitor any computing device and/or any application running on a computing device and is not restricted to an ebook purchasing application.

Figure 3:
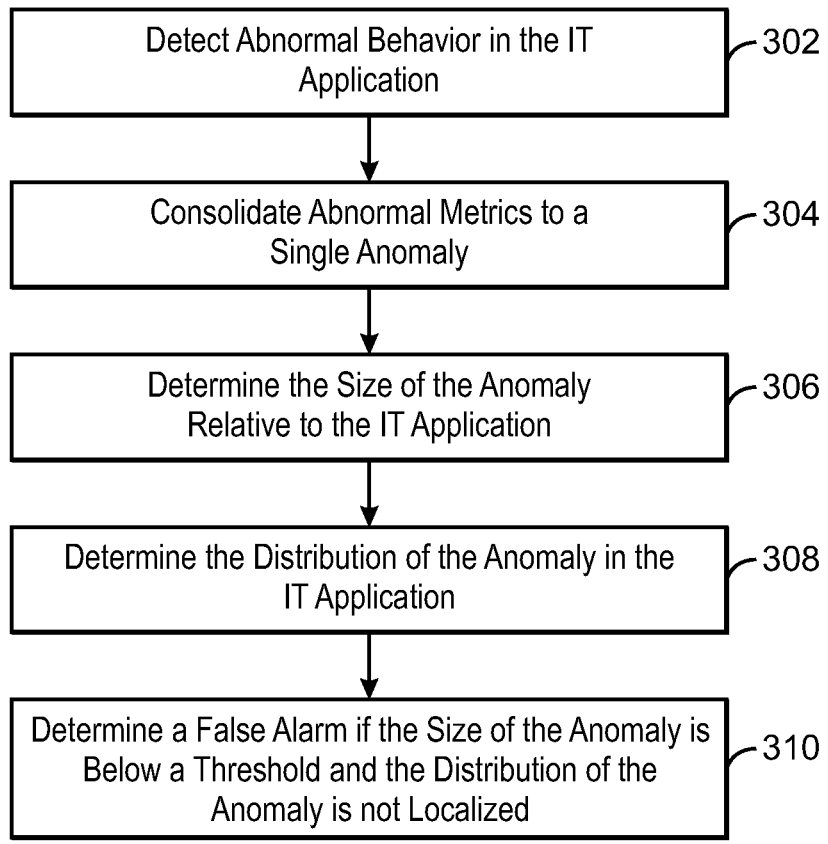
FIG. 3 is a process flowchart of an example of a method of automatically suppressing false alarms in an IT system.

FIG. 3 is a process flowchart of a method 300 of automatically suppressing false alarms in an IT system. At block 302, abnormal behavior in the IT application is detected. Abnormal behavior is noted by one or more monitors that produce abnormal measurements, or abnormal metrics, at the same time, in an IT application. Abnormal behavior is a metrics value that exceeds the normal behavior or baseline.

At block 304, abnormal metrics are correlated to a single anomaly. The abnormal metrics are correlated, such as autocorrelated, by a service health analyzer. The service health analyzer uses a run-time service model (RTSM) to correlate the abnormal metrics. The run-time service model stores information about the relationships between the Configuration Items (CIs) in the information technology (IT) system. By correlating the abnormal metrics, the abnormal metrics are analyzed as a whole, rather than individually.

At block 306, the size of the anomaly relative to the entire IT application is determined. The size of the anomaly can be determined as a percentage of the IT application. The size of the anomaly can be determined by a service health analyzer using a selection of algorithms.

At block 308, the distribution of the anomaly within the IT application is determined. The distribution of the anomaly can be determined by a service health analyzer using a selection of algorithms. At block 310, a false alarm is determined. If the size of the anomaly is below a threshold, the alarm is determined to be false. If the size of the anomaly is above the threshold, the alarm is determined to be non-false. The threshold can be set by a user or a manufacturer. If the distribution of the anomaly is not localized, but rather spread through the IT application, the alarm is determined to be false. If the distribution of the anomaly is localized within the IT application, the alarm is determined to be non-false. An alarm is determined to be false if both the size of the anomaly is below the threshold and the anomaly is distributed, not localized. If an alarm is determined to be false, a user is not notified of the alarm, such as in an NOC or computing device. However, if an alarm is determined to be non-false, a user is notified.

Figure 4:
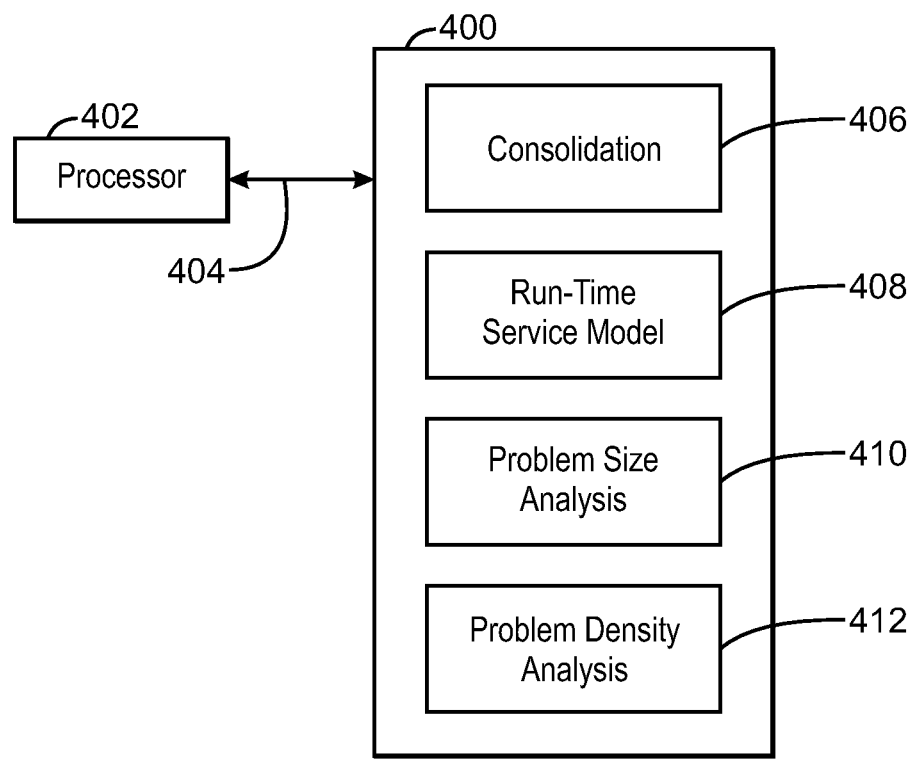
FIG. 4 is a block diagram of an example of a system for automatically suppressing false alarms in an IT system.

FIG. 4 is a block diagram of a tangible, non-transitory, computer-readable medium containing code for prioritizing network faults. The tangible, non-transitory, computer-readable medium is referred to by the reference number 400. The tangible, non-transitory, computer-readable medium 400 can comprise RAM, a hard disk drive, an array of hard disk drives, an optical drive, an array of optical drives, a non-volatile memory, a universal serial bus (USB) drive, a digital versatile disk (DVD), or a compact disk (CD), among others. The tangible, non-transitory, computer-readable medium 400 may be accessed by a processor 402 over a computer bus 404. Furthermore, the tangible, non-transitory, computer-readable medium 400 may include code configured to perform the methods described herein.

As shown in FIG. 4, the various components discussed herein can be stored on the non-transitory, computer-readable medium 400. A first region 406 on the tangible, non-transitory, computer-readable medium 400 can include a correlation module for correlating the metrics of a computing device to a single anomaly. A region 408 can include a run-time service model for storing all information about the relationships between the Configuration Items (CIs) in the information technology (IT) system. A region 410 can include a problem size analysis to determine the size of the anomaly in the IT system. A region 412 can include a problem density analysis to determine the distribution of the anomaly in the IT system. Although shown as contiguous blocks, the software components can be stored in any order or configuration. For example, if the tangible, non-transitory, computer-readable medium 400 is a hard drive, the software components can be stored in non-contiguous, or even overlapping, sectors.

EXAMPLE 1

A system is disclosed herein. The system includes a health analysis engine to consolidate abnormal metrics in an IT application to a single anomaly. The system also includes a problem size analysis engine to determine a size of the anomaly relative to the IT application and if the size of the anomaly exceeds a threshold. The system further includes a problem density analysis engine to determine a distribution of the anomaly in the IT application. The system additionally includes a decision engine to determine a false alarm based on if the size of the anomaly exceeds the threshold and the distribution of the anomaly in the IT application.

A false alarm can be determined by the decision engine when the size of the anomaly is below the threshold. A false alarm can be determined by the decision engine when the anomaly is distributed through the IT application. A false alarm can also be determined by the decision engine when the size of the anomaly is below the threshold and when the anomaly is distributed through the IT application. The system can monitor activity on a computing device. The system can be located on a server and monitor activity on a computing device coupled to the server. The system can alert a user only when an alarm is determined to be non-false.

EXAMPLE 2

A method is disclosed herein. The method includes receiving metrics of an IT application in a monitoring system and consolidating abnormal metrics of the metrics into a single anomaly. The method also includes determining a size of the anomaly relative to the IT application. The method further includes determining a distribution of the anomaly in the IT application. The method additionally includes determining a false alarm based on the size and the distribution of the anomaly.

The monitoring system can be located on a server, the monitoring system monitoring activity on a computing device coupled to the server. A false alarm can be determined when the size of the anomaly is below a threshold. A false alarm can be determined when the anomaly is distributed through the IT application. A false alarm can also be determined when the size of the anomaly is below a threshold and when the anomaly is distributed through the IT application. The method can further comprise alerting a user only when an alarm is determined to be non-false.

EXAMPLE 3

A tangible, non-transitory, computer-readable storage medium is disclosed herein. The tangible, non-transitory, computer-readable storage medium includes code to consolidate the abnormal metrics of an IT application to a single anomaly. The tangible, non-transitory, computer-readable storage medium also includes code to determine a size of the anomaly relative to the IT application. The tangible, non-transitory, computer-readable storage medium further includes code to determine a distribution of the anomaly in the IT application. The tangible, non-transitory, computer-readable storage medium additionally includes code to determine a false alarm based on the size and the distribution of the anomaly.

The anomaly can include system metrics and business metrics. A false alarm can be determined when the size of the anomaly is below a threshold. A false alarm can be determined when the anomaly is distributed through the IT application. A false alarm can also be determined when the size of the anomaly is below the threshold and when the anomaly is distributed through the IT application. A user can be notified only when an alarm is determined to be non-false. The tangible, non-transitory, computer-readable medium can be coupled to a server and the code can direct a system to monitor activity on a computing device coupled to the server.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A system, comprising:
   a health analysis engine to consolidate abnormal metrics in an IT application to a single anomaly, wherein the consolidated abnormal metrics include grouped isolated information related to the same IT application;
   a problem size analysis engine to determine a size of the anomaly relative to the IT application and if the size of the anomaly exceeds a threshold;
   a problem density analysis engine to determine a distribution of the anomaly in the IT application; and
   a decision engine to determine a false alarm based on if the size of the anomaly exceeds the threshold and the distribution of the anomaly in the IT application.

2. The system of claim 1, wherein a false alarm is determined by the decision engine when the size of the anomaly is below the threshold.

3. The system of claim 1, wherein a false alarm is determined by the decision engine when the anomaly is distributed through the IT application.

4. The system of claim 1, wherein a false alarm is determined by the decision engine when the size of the anomaly is below the threshold and when the anomaly is distributed through the IT application.

5. The system of claim 1, wherein the system monitors activity on a computing device.

6. The system of claim 1, wherein the system is located on a server and wherein the system monitors activity on a computing device coupled to the server.

7. The system of claim 1, wherein the system alerts a user only when an alarm is determined to be non-false.

8. A method, comprising:
   receiving metrics of an IT application in a monitoring system;
   consolidating abnormal metrics of the metrics into a single anomaly, wherein the consolidated abnormal metrics include grouped isolated information related to the same IT application;
   determining a size of the anomaly relative to the IT application;
   determining a distribution of the anomaly in the IT application; and
   determining a false alarm based on the size and the distribution of the anomaly.

9. The method of claim 8, wherein the monitoring system is located on a server, the monitoring system monitoring activity on a computing device coupled to the server.

10. The method of claim 8, wherein a false alarm is determined when the size of the anomaly is below a threshold.

11. The method of claim 8, wherein a false alarm is determined when the anomaly is distributed through the IT application.

12. The method of claim 8, wherein a false alarm is determined when the size of the single anomaly is below a threshold and when the anomaly is distributed through the IT application.

13. The method of claim 8, further comprising alerting a user only when an alarm is determined to be non-false.

14. A tangible, non-transitory, computer-readable storage medium, comprising code to:
   consolidate the abnormal metrics of an IT application to a single anomaly, wherein the consolidated abnormal metrics include grouped isolated information related to the same IT application;
   determine a size of the anomaly relative to the IT application;
   determine a distribution of the anomaly in the IT application; and
   determine a false alarm based on the size and the distribution of the anomaly.

15. The tangible, non-transitory, computer-readable medium of claim 14, wherein the anomaly comprises system metrics and business metrics.

16. The tangible, non-transitory, computer-readable medium of claim 14, wherein a false alarm is determined when the size of the anomaly is below a threshold.

17. The tangible, non-transitory, computer-readable medium of claim 14, wherein a false alarm is determined when the anomaly is distributed through the IT application.

18. The tangible, non-transitory, computer-readable medium of claim 14, wherein a false alarm is determined when the size of the anomaly is below a threshold and when the anomaly is distributed through the IT application.

19. The tangible, non-transitory, computer-readable medium of claim 14, wherein a user is alerted only when an alarm is determined to be non-false.

20. The tangible, non-transitory, computer-readable medium of claim 14, wherein the tangible, non-transitory, computer-readable medium is coupled to a server and wherein the code directs a system to monitor activity on a computing device coupled to the server.

\* \* \* \* \*